(12) United States Patent
Padubidri et al.

(10) Patent No.: US 12,026,039 B2
(45) Date of Patent: Jul. 2, 2024

(54) REPAIR MODE FOR COMPUTING DEVICES

(71) Applicant: Dell Products L.P., Round Rock, TX (US)

(72) Inventors: Subramanya Padubidri, Bangalore (IN); Vasuda CS, Bengaluru (IN); Rakesh Kumar, Bengaluru (IN); Amit Swami, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 17/888,792

(22) Filed: Aug. 16, 2022

(65) Prior Publication Data

US 2024/0061736 A1    Feb. 22, 2024

(51) Int. Cl.
*G06F 11/07*      (2006.01)
*G06Q 30/016*      (2023.01)
*H04L 9/08*      (2006.01)

(52) U.S. Cl.
CPC ...... *G06F 11/0748* (2013.01); *G06F 11/0784* (2013.01); *G06Q 30/016* (2013.01); *H04L 9/0863* (2013.01)

(58) Field of Classification Search
CPC ............. G06F 11/0748; G06F 11/0784; G06Q 30/016; H04L 9/0863
USPC ...................................................... 714/38.14
See application file for complete search history.

(56) References Cited

U.S. PATENT DOCUMENTS

| | | | | |
|---|---|---|---|---|
| 11,861,145 | B2* | 1/2024 | Wohlstadter | ........ G06F 3/04845 |
| 2002/0035447 | A1* | 3/2002 | Takahashi | .......... G05B 23/0294 |
| | | | | 700/121 |
| 2012/0254762 | A1* | 10/2012 | Parmar | .................. G06Q 30/02 |
| | | | | 715/736 |
| 2013/0263288 | A1* | 10/2013 | Palanichamy | .......... G06F 21/31 |
| | | | | 726/30 |

(Continued)

FOREIGN PATENT DOCUMENTS

JP      2013030052 A   *   2/2013

OTHER PUBLICATIONS

R. McMillan, "Police: Mac Technician Installed Spyware to Photograph Women," https://www.computerworld.com/article/2509173/police--mac-technician-installed-spyware-to-photograph-women.html, Jun. 8, 2011, 2 pages.

(Continued)

*Primary Examiner* — Chae M Ko
(74) *Attorney, Agent, or Firm* — Ryan, Mason & Lewis, LLP

(57) ABSTRACT

An apparatus comprises a processing device configured to receive a request for access to a first computing device and to determine, utilizing a time-varying password generation algorithm, a password for a repair mode user account on the first computing device, the repair mode user account having restricted access to user data stored on the first computing device. The processing device is also configured to access, utilizing the determined password, the repair mode user account on the first computing device. The processing device is further configured to record one or more actions performed on the first computing device while the first computing device is being accessed using the repair mode user account, and to provide the recorded one or more actions for viewing on a second computing device different than the first computing device.

20 Claims, 14 Drawing Sheets

(56) References Cited

U.S. PATENT DOCUMENTS

| | | | |
|---|---|---|---|
| 2015/0074259 A1* | 3/2015 | Ansari | H04M 15/31 |
| | | | 709/224 |
| 2015/0312427 A1* | 10/2015 | Roulland | G06F 11/0748 |
| | | | 358/1.15 |
| 2016/0117458 A1* | 4/2016 | Hermans | G16H 10/65 |
| | | | 705/2 |
| 2017/0279927 A1* | 9/2017 | Ramareddy | H04L 43/10 |
| 2019/0007212 A1* | 1/2019 | Neve de Mevergnies | |
| | | | G06F 21/72 |
| 2019/0361694 A1* | 11/2019 | Gordon | G06F 9/452 |
| 2020/0110651 A1* | 4/2020 | Milman | G06F 11/2263 |

OTHER PUBLICATIONS

D. M'Raihi et al., "TOTP: Time-Based One-Time Password Algorithm," Internet Engineering Task Force, RFC 6238, https://datatracker.ietf.org/doc/html/rfc6238, May 2011, 16 pages.

B. Conroy, "Use Streaming in ASP.NET Core SignalR," https://docs.microsoft.com/en-us/aspnet/core/signalr/streaming?view=aspnetcore-6.0, Jul. 5, 2022, 9 pages.

T. Steiner, "WebScoketStream: Integrating Streams with the WebSocket API," https://web.dev/websocketstream/, Feb. 23, 2021, 9 pages.

* cited by examiner

```
using System;
using System.Security.Cryptography;
using System.Text;

namespace PAGPA1go
{
    public class Tpagp
    {
        private const string ZeroChar = "0";

private const int XFToDec = 15;
        private const int XFFToDec = 255;
        private const int X7FToDec = 127;
        private const int ZeroIndexBitRotationCount = 24;
        private const int FirstIndexBitRotationCount = 16;
        private const int SecondIndexBitRotationCount = 8;
        private const int OffsetIndex = 19;
        private const int pagpDigits = 8;

//time should contain UTC format of date, and is passed with yyyymmdd in hexadecimal format
        //derive the secret as a SHA256 of its attributes
        //secret attributes may include a device identifier, customer number, product model, and invoice number
        private string pagpForTime(string time, string secret)
        {
            byte[] hash;

using (var hmac = new HMACSHA1(Encoding.UTF8.GetBytes(secret)))
            {
                hash = hmac.ComputeHash(GetByteArray(time));
            }
```

FIG. 7A

```
int offset = hash[OffsetIndex] & XFToDec;
int zeroIndexOffsetVal = (hash[offset] & X7FToDec) << ZeroIndexBitRotationCount;
int firstIndexOffsetVal = (hash[offset + 1] & XFFToDec) << FirstIndexBitRotationCount;
int secondIndexOffsetVal = (hash[offset + 2] & XFFToDec) << SecondIndexBitRotationCount;
int thirdIndexOffsetVal = (hash[offset + 3] & XFFToDec);
int offsetResult = zeroIndexOffsetVal | firstIndexOffsetVal | secondIndexOffsetVal | thirdIndexOffsetVal;
double computedpagpDouble = offsetResult & Math.Pow(10, pagpDigits);

StringBuilder computedpagpString = new StringBuilder(computedpagpDouble.ToString());

while (computedpagpString.Length < pagpDigits)
{
    computedpagpString.Insert(0, ZeroChar);
} return computedpagpString.ToString();
} private byte[] GetByteArray(string str)
{
    byte[] byteArray = new byte[str.Length / 2];
    for (int i=0; i < (str.Length / 2); i++)
    {
        byteArray[i] = Convert.ToByte(str.Substring((i * 2), 2), 16);
    }
    return byteArray;
}
}
```

FIG. 7B

```
$acl = Get-ACL 'c:\user'
$rules = $acl.access | Where-Object {
    (-not $_.IsInherited) -and
    $_.IdentityReference -like "repair_agent"
}
ForEach($rule in $rules) {
    $acl.RemoveAccessRule($rule) | Out-Null
}
Set-ACL -Path 'c:\user' -AclObject $acl
```

REPAIR MODE FOR COMPUTING DEVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to device management in information processing systems.

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for enabling a smart, secure and intuitive repair mode for computing devices.

In one embodiment, an apparatus comprises at least one processing device comprising a processor coupled to a memory. The at least one processing device is configured to perform the steps of receiving a request for access to a first computing device and determining, utilizing a password generation algorithm, a password for a repair mode user account on the first computing device, the repair mode user account having restricted access to user data stored on the first computing device. The at least one processing device is also configured to perform the step of accessing, utilizing the determined password, the repair mode user account on the first computing device. The at least one processing device is further configured to perform the steps of recording one or more actions performed on the first computing device while the first computing device is being accessed using the repair mode user account, and providing the recorded one or more actions for viewing on a second computing device different than the first computing device.

These and other illustrative embodiments include, without limitation, methods, apparatus, networks, systems and processor-readable storage media.

BRIEF DESCRIPTION OF THE DRAWINGS

FIGS. 7A and 7B shows pseudocode for an algorithm for periodic auto-generation of passwords for a repair mode user account in an illustrative embodiment.

FIG. 9 shows pseudocode for restricting folder access on a repair mode user account in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
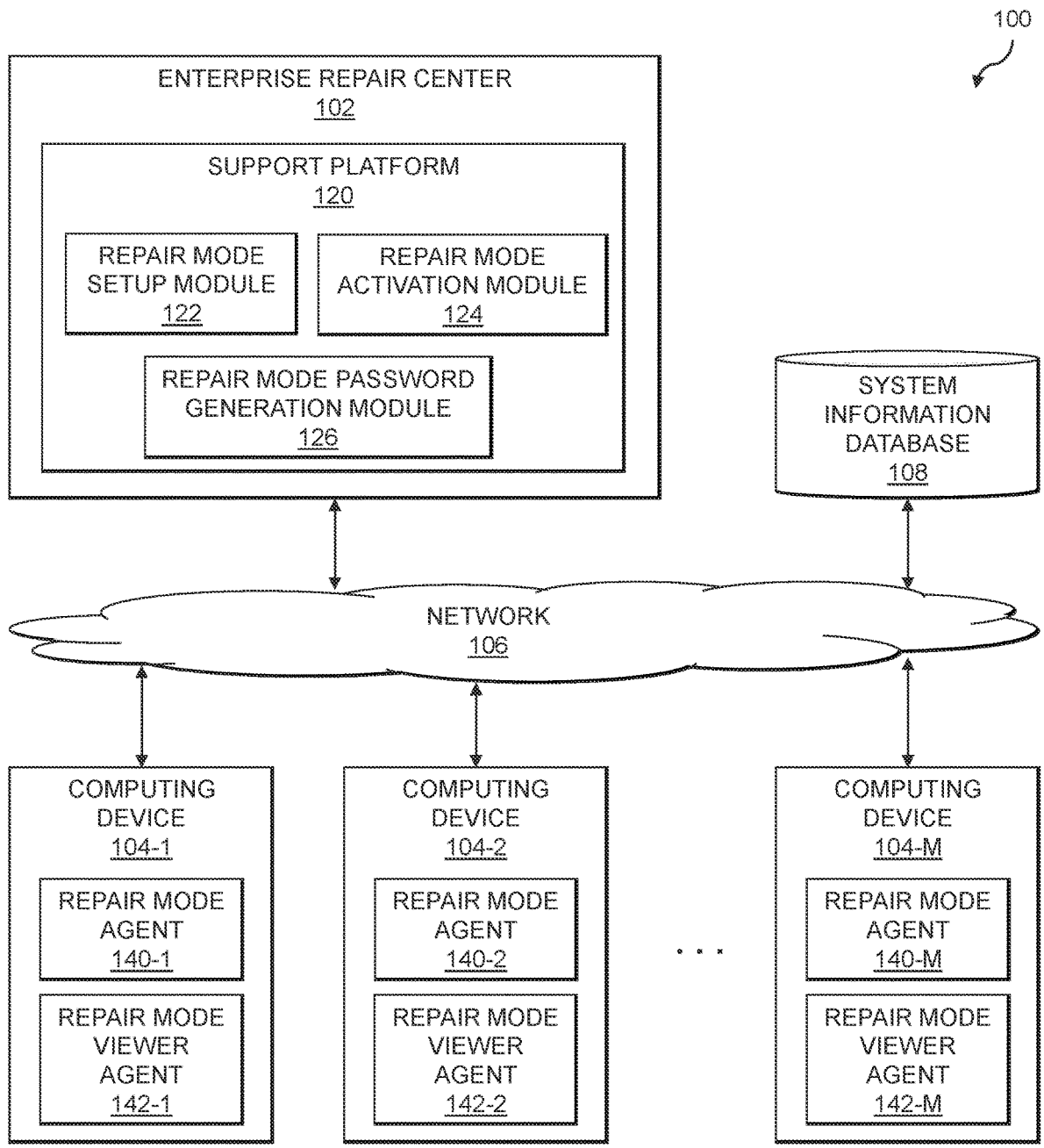
FIG. 1 is a block diagram of an information processing system configured for enabling a smart, secure and intuitive repair mode for computing devices in an illustrative embodiment.

FIG. 1 shows an information processing system 100 configured in accordance with an illustrative embodiment. The information processing system 100 is assumed to be built on at least one processing platform and provides functionality for enabling a smart, secure and intuitive repair mode. The information processing system 100 includes an enterprise repair center 102 and a plurality of computing devices 104-1, 104-2, . . . 104-M (collectively, computing devices 104) that are coupled to a network 106. Also coupled to the network 106 is a system information database 108, which may store various information relating to the computing devices 104 (e.g., information used to derive secret keys used as input for password generation algorithms that generate passwords for repair mode accounts on the computing devices 104).

The enterprise repair center 102 in the FIG. 1 embodiment includes a support platform 120, which is assumed to provide repair or other support services for the computing devices 104. The computing devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The computing devices 104 may also or alternately comprise virtualized computing resources, such as virtual machines (VMs), containers, etc.

The computing devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the computing devices 104 comprise assets of an information technology (IT) infrastructure operated by an enterprise, and the enterprise repair center 102 is configured to provide support services for such assets using the support platform 120.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

As noted above, in some embodiments the support platform 120 of the enterprise repair center 102 is used for providing support services for an enterprise system (e.g., an IT infrastructure comprising the computing devices 104). For example, an enterprise may subscribe to or otherwise utilize the support platform 120 to manage a set of assets (e.g., the computing devices 104) operated by users of the enterprise. As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The system information database 108, as discussed above, is configured to store and record information relating to the computing devices 104 or other assets that are managed using the support platform 120. Such information illustratively includes attributes of the computing devices 104 which may be used to derive secret keys providing at least a portion of an input for a password generation algorithm used to generate passwords for repair mode accounts on the computing devices 104. In some embodiments, one or more of the storage systems utilized to implement the system information database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102 and/or support platform 120, as well as to support communication between the enterprise repair center 102, the support platform 120 and other related systems and devices not explicitly shown.

The support platform 120 may be operated by a hardware vendor that manufactures and sells computing devices (e.g., desktops, laptops, tablets, smartphones, etc.), and the computing devices 104 may represent computing devices sold by that hardware vendor. The support platform 120, however, is not required to be operated by a hardware vendor that manufactures and sells computing devices. Instead, the support platform 120 may be offered as a service to provide support for computing devices that are sold by any number of hardware vendors. The computing devices 104 may subscribe to the support platform 120, so as to provide support including troubleshooting of hardware and software components of the computing devices 104. Various other examples are possible.

In some embodiments, the computing devices 104 may implement host agents, shown as repair mode agents 140-1, 140-2, . . . 140-M (collectively repair mode agents 140) and repair mode viewer agents 142-1, 142-2, . . . 142-M (collectively, repair mode viewer agents 142), that are configured for automated transmission of information in conjunction with service requests that are processed by the support platform 120. Such information may include, for example, screen captures or other recordings of activities which are performed on the computing devices 104 by technicians of the support platform 120 (e.g., while such technicians are logged in to the computing devices 104 using repair mode accounts described in further detail below). While in the FIG. 1 embodiment each of the computing devices 104 is shown as including both one of the repair mode agents 140 and one or more repair mode viewer agents 142, this is not a requirement. For example, the computing device 104-1 may implement the repair mode agent 140-1, which is configured to make available screen captures or other recordings of activities which are performed on the computing device 104-1 by technicians of the support platform 120 that are logged in to the computing device 104-1 via a repair mode account. Other ones of the computing devices 104, such as computing device 104-2, may implement repair mode viewer agent 142-2 that enables a user to view and monitor the activities that are performed on the computing device 104-1 by the technicians of the support platform 120 that are logged in to the computing device 104-1 via the repair mode account. The host agents (e.g., the repair mode agents 140 and/or repair mode viewer agents 142) may comprise support software that is installed on the computing devices 104, or which is accessible via a web site or web portal offered by the support platform 120.

It should be noted that a "host agent" as this term is generally used herein may comprise an automated entity, such as a software entity running on a processing device. Accordingly, a host agent need not be a human entity.

As shown in FIG. 1, the enterprise repair center 102 includes the support platform 120. The support platform 120, as will be described in further detail below, is configured to set up and manage repair mode user accounts for the computing devices 104. Although shown as an element of the enterprise repair center 102 in this embodiment, the support platform 120 in other embodiments can be implemented at least in part externally to the enterprise repair center 102, for example, as a stand-alone server, set of servers or other type of system coupled to the network 106. In some embodiments, the support platform 120 or components thereof may be implemented at least in part within one or more of the computing devices 104.

The support platform 120 in the FIG. 1 embodiment is assumed to be implemented using at least one processing device. Each such processing device generally comprises at least one processor and an associated memory, and implements one or more functional modules for controlling certain features of the support platform 120. In the FIG. 1 embodiment, the support platform 120 includes a repair mode setup module 122, a repair mode activation module 124 and a repair mode password generation module 126.

The support platform 120 is configured to process servicing requests submitted by users of the computing devices 104 for servicing of computing devices (which may be the computing devices 104 themselves). The repair mode setup module 122 is configured to set up and configure a repair mode on the computing devices 104. This may include installing the repair mode agents 140 on the computing devices 104, and setting up repair mode user accounts on the computing devices 104. The repair mode activation module 124 is configured to initiate screen capture or other recording of activities performed on the computing devices 104 while users are logged in to the computing devices 104 using the repair mode user accounts. This may be facilitated by the repair mode agents 140 running on the computing devices 104. The repair mode password generation module 126 is configured to allow users to generate passwords for the repair mode user accounts (e.g., dynamically based on a token counter and a secret key derived from attributes of the computing devices 104 which are stored in the system information database 108).

It is to be appreciated that the particular arrangement of the enterprise repair center 102, the support platform 120, the repair mode setup module 122, the repair mode activation module 124, the repair mode password generation module 126, the computing devices 104, the repair mode agents 140, the repair mode viewer agents 142 and the system information database 108 illustrated in the FIG. 1 embodiment is presented by way of example only, and alternative arrangements can be used in other embodiments. As discussed above, for example, the support platform 120 or one or more components thereof may be implemented external to the enterprise repair center 102. As another example, the functionality associated with the repair mode setup module 122, the repair mode activation module 124, the repair mode password generation module 126, the repair mode agents 140 and the repair mode viewer agents 142 may be combined into fewer modules, or separated across more modules with the multiple modules possibly being implemented with multiple distinct processors or processing devices.

At least portions of the repair mode setup module 122, the repair mode activation module 124, the repair mode password generation module 126, the repair mode agents 140 and the repair mode viewer agents 142 may be implemented at least in part in the form of software that is stored in memory and executed by a processor.

It is to be understood that the particular set of elements shown in FIG. 1 for set up and management of repair mode user accounts for the computing devices 104 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the support platform 120 may be implemented external to the enterprise repair center 102, such that the enterprise repair center 102 can be eliminated.

The support platform 120 and other portions of the information processing system 100, as will be described in further detail below, may be part of cloud infrastructure.

The computing devices 104, the support platform 120 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The computing devices 104 and the support platform 120, or components thereof, may be implemented on respective distinct processing platforms, although numerous other arrangements are possible. For example, in some embodiments at least portions of the support platform 120 and one or more of the computing devices 104 are implemented on the same processing platform. A given computing device (e.g., 104-1) can therefore be implemented at least in part within at least one processing platform that implements at least a portion of the support platform 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise repair center 102, the support platform 120, the computing devices 104, the system information database 108, or portions or components thereof, to reside in different data centers. Numerous other distributed implementations are possible. The support platform 120 can also be implemented in a distributed manner across multiple data centers.

Additional examples of processing platforms utilized to implement the computing devices 104, support platform 120 and other components of the system 100 in illustrative embodiments will be described in more detail below in conjunction with FIGS. 12 and 13.

It is to be appreciated that these and other features of illustrative embodiments are presented by way of example only, and should not be construed as limiting in any way.

Figure 2:
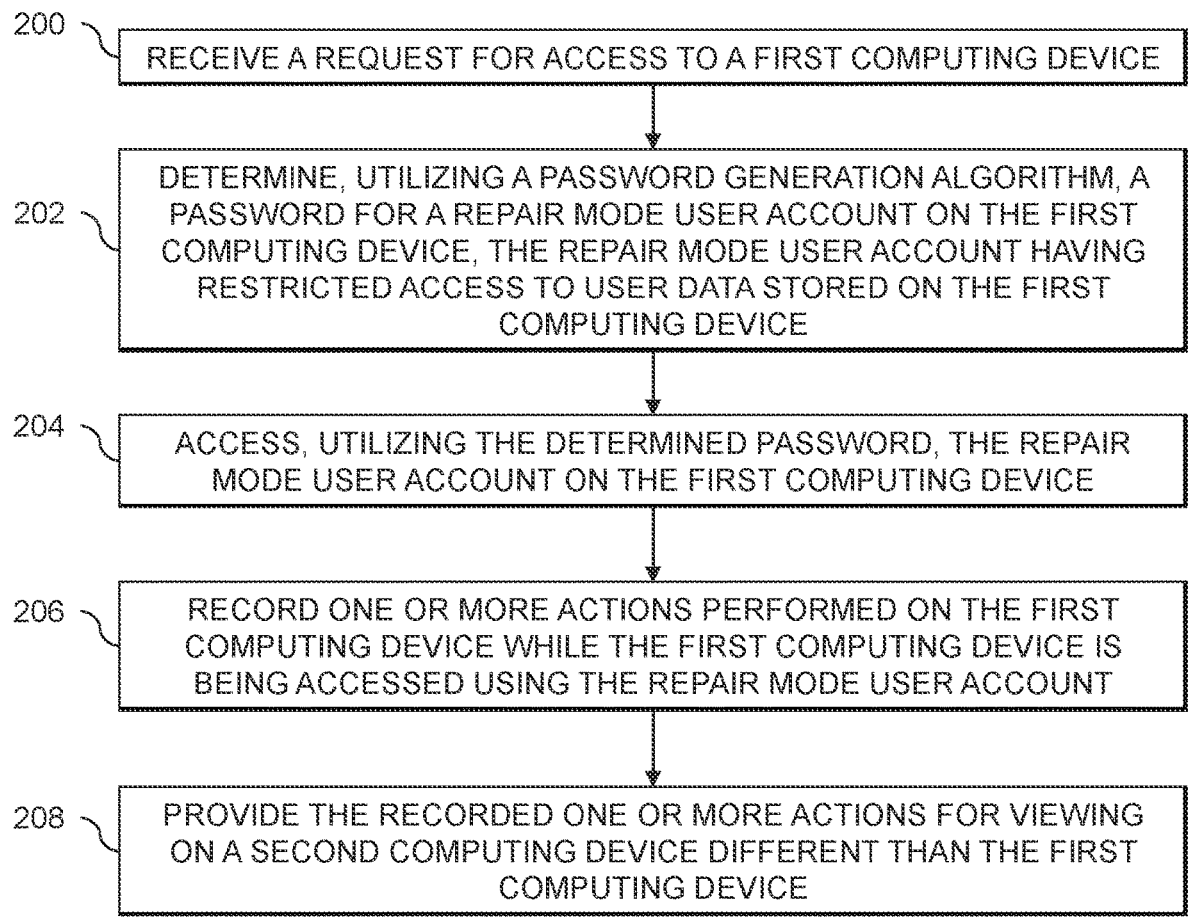
FIG. 2 is a flow diagram of an exemplary process for enabling a smart, secure and intuitive repair mode for computing devices in an illustrative embodiment.

An exemplary process for enabling a smart, secure and intuitive repair mode for computing devices will now be described in more detail with reference to the flow diagram of FIG. 2. It is to be understood that this particular process is only an example, and that additional or alternative processes for enabling a smart, secure and intuitive repair mode for computing devices may be used in other embodiments.

In this embodiment, the process includes steps 200 through 208. These steps are assumed to be performed by the support platform 120 and/or the computing devices 104 utilizing one or more of the repair mode setup module 122, the repair mode activation module 124, the repair mode password generation module 126, the repair mode agents 140 and the repair mode viewer agents 142. The process begins with step 200, receiving a request for access to a first computing device (e.g., computing device 104-1). The request for access to the first computing device is received while the first computing device is at a repair center (e.g., enterprise repair center 102). The repair center may be operated by a hardware vendor of the first computing device, or an enterprise which controls the first computing device (e.g., issues the first computing device for use by members of the enterprise).

In step 202, a password generation algorithm is used to determine a password for a repair mode user account on the first computing device. The repair mode user account has restricted access to user data stored on the first computing device. The repair mode user account may restrict access to the user data stored on the first computing device by enforcing folder restrictions using a repair mode software agent running as a background service on the first computing device. Step 202 may be based at least in part on a time-varying token counter value and a secret key. The time-varying token counter value may specify a designated interval, the designated interval comprising at least one of a given date of each month, a given day of each week, and a given hour of each day. The secret key may be derived from one or more attributes of the first computing device, the one or more attributes comprising at least one of a system unique identifier of the first computing device, a customer number for a customer that purchased the first computing device, a product model of the first computing device, and an invoice number for the customer purchase of the first computing device. Step 202 may include determining the password for the repair mode user account based at least in part on application of a keyed hash function to a time-varying token counter value and a secret key.

In step 204, the password determined in step 202 is utilized to access the repair mode user account on the first computing device. One or more actions performed on the first computing device, while the first computing device is being accessed using the repair mode user account, are recorded in step 206. The recorded one or more actions are provided for viewing on a second computing device (e.g., computing device 104-2) different than the first computing device in step 208. Step 206 may comprise generating a screen capture of the first computing device, and step 208 may comprise providing live streaming or a recorded stream of the generated screen capture of the first computing device to the second computing device. Step 206 may also or alternatively comprise generating a summary of the one or more actions. The generated summary may comprise at least one of: login and logout times for the repair mode user account; indications of at least one of drivers and software installed on the first computing device; modifications to one or more folders of the first computing device; and copying, deletion, access and modification of one or more files of the first computing device.

When computing devices 104 (e.g., personal computers (PCs) or other types of computing devices) are sent in for repair to enterprise repair center 102, there is a risk of compromise of personal or other confidential data which is stored on the computing devices 104. For example, users of the computing devices 104 may experience frustration or uneasiness with sharing their devices when personal or other confidential data is stored thereon. There is also a risk of spyware or other malicious software being installed on the computing devices 104 while at the enterprise repair center 102 (e.g., by malicious users at the enterprise repair center 102). To address these and other risks, a new user account may be created on a given computing device (e.g., computing device 104-1) for use by the enterprise repair center 102 so that technicians or users thereof can login to the given computing device 104-1 and perform troubleshooting, maintenance or other types of support actions. Such an approach, however, still does not address the concerns of data security. Thus, some users may delete or transfer all of their personal or other confidential data to other systems before submitting their computing devices 104 to the enterprise repair center 102, which is time-consuming and inconvenient. There are also certain cases where the computing devices 104 are not capable of being started, such that the computing devices 104 need to be dropped off at the enterprise repair center 102 and the users do not have the opportunity to delete or transfer personal or other confidential data off the computing devices 104.

In some cases, the computing devices 104 are sent to the enterprise repair center 102 to troubleshoot hardware issues, to perform part replacements, etc. In such cases, there are different processes followed to track the computing devices 104, to track customer or user appointments, to determine when the computing devices 104 will be available for collection, etc. A concern for the customers or users sharing their computing devices 104 with the enterprise repair center 102 is how to trust service center technicians of the enterprise repair center 102 when there is some personal or other confidential data stored on the computing devices 104. Such issues can present major frustrations for customers or other users that submit the computing devices 104 to the enterprise repair center 102.

PCs or other computing devices may be submitted to repair centers for part repair or replacement, for reinstallation of an operating system (OS) or other applications or software, etc. In various embodiments, it is assumed that the PCs or other computing devices that are received at a repair center do not require or result in reinstallation of an OS thereof, but do require service technicians of the repair center to login to the PCs or other computing devices to perform troubleshooting, repair, maintenance or other support actions, and to verify any fixes applied thereto (e.g., including verifying successful part repair or replacement).

Illustrative embodiments provide technical solutions for enabling a "repair mode" for PCs or other computing devices (e.g., computing devices 104). The repair mode brings multiple factors into consideration to build trust with customers or other users, and to enable a seamless experience for repairing or otherwise servicing PCs or other computing devices. The technical solutions described herein advantageously do not require a customer to log in, but bring transparency on what happens to the customer's PC or other computing device at a repair center (e.g., enterprise repair center 102). In some embodiments, an automated method for setting up a repair account on a PC or other computing device is provided, which will be activated when a service technician at a repair center logs in to the PC or other computing device. The repair account will have restricted access, and enables screening of actions performed by service technicians on the PC or other computing device. Activities performed on the PC or other computing device while a service technician is logged in view the repair account are recorded and stored, so that the customer can view such activities at any point in time. If available, the activities may also be live-streamed to the customer (e.g., where the live stream is accessible via a web portal, website or other application that is coupled to a streaming server which receives streaming data from a streaming agent running on the PC or other computing device). The repair account in some embodiments has restricted folder access, and will not be allowed to access any folders that may contain personal or confidential data. For example, folder access may be restricted to OS folders, driver folders, etc. which a service technician may need to access in order to perform troubleshooting, maintenance or other servicing actions. The repair account may also have its password or other credential updated periodically, so that the system is protected from malicious users.

With growing concerns on data security, customers or other users may feel insecure submitting their PCs or other computing devices to service or repair centers, where service technicians have to troubleshoot, repair parts or otherwise perform maintenance or other servicing of the PCs or other computing devices. Some PC and other computing device vendors ask customers or users to create new accounts before PCs or other computing devices are submitted to service or repair centers. Such accounts, however, have no clear procedure or protections built in to ensure customer trust. Further, conventional approaches are fragmented and can lead to data leaks and other customer trust issues. In addition, there is no clarity on what happens when PCs or other computing devices are submitted to service or repair centers which can also lead to frustration for customers.

The technical solutions described herein can advantageously bring clarity to customers on what actions are performed on their PCs or other computing devices while at a service or repair center. The technical solutions described herein ensure that only a specific "repair account" may be used by technicians, where the repair account has restricted access and actions taken while a user (e.g., a service technician) is logged in via the repair account are captured so that the customer can view such actions and track what is done on their PCs or other computing devices. The captured actions are made available to the customer as at least one of a live stream and an offline stream. Summaries of the captured actions may also be generated and made available to the customer. Thus, the technical solutions described herein overcome various technical problems associated with submitting PCs or other computing devices to service or repair centers, including lack of trust and transparency on actions performed on the PCs or other computing devices while at a service or repair center. For example, conventional approaches which rely on using a customer's personal account to log in, or which use a non-restricted user account, can lead to various customer satisfaction issues.

In some embodiments, a framework is provided which addresses concerns when customers submit their PCs or other computing devices to service or repair centers. The framework includes a novel "repair mode" on the PCs or other computing devices, which will bring confidence and trust to customers that submit their PCs or other computing devices to service or repair centers. A manufacturer or vendor of PCs or other computing devices may locate unique system identifiers (e.g., service tags, serial numbers, etc.) and map customers to assets (e.g., PCs or other computing devices) based on purchase history. Thus, assets are associated to customers or other users, and a website or web portal may be used to provide controlled access for such assets (e.g., including service requests, system updates, etc.). In various embodiments described below, a sequence of events is considered where a customer or user submits their PC or other computing device to a service or repair center, and where entitled users of the PC or other computing device can be identified and tracked through a web portal, website or other application or service.

The technical solutions in some embodiments include identifying a system (e.g., a PC or other computing device), setting up a repair mode on the system (e.g., using an automated or manual process), utilizing algorithms for password generation and maintenance of repair agent accounts, activating repair mode, and enabling repair mode visibility.

Figure 3:
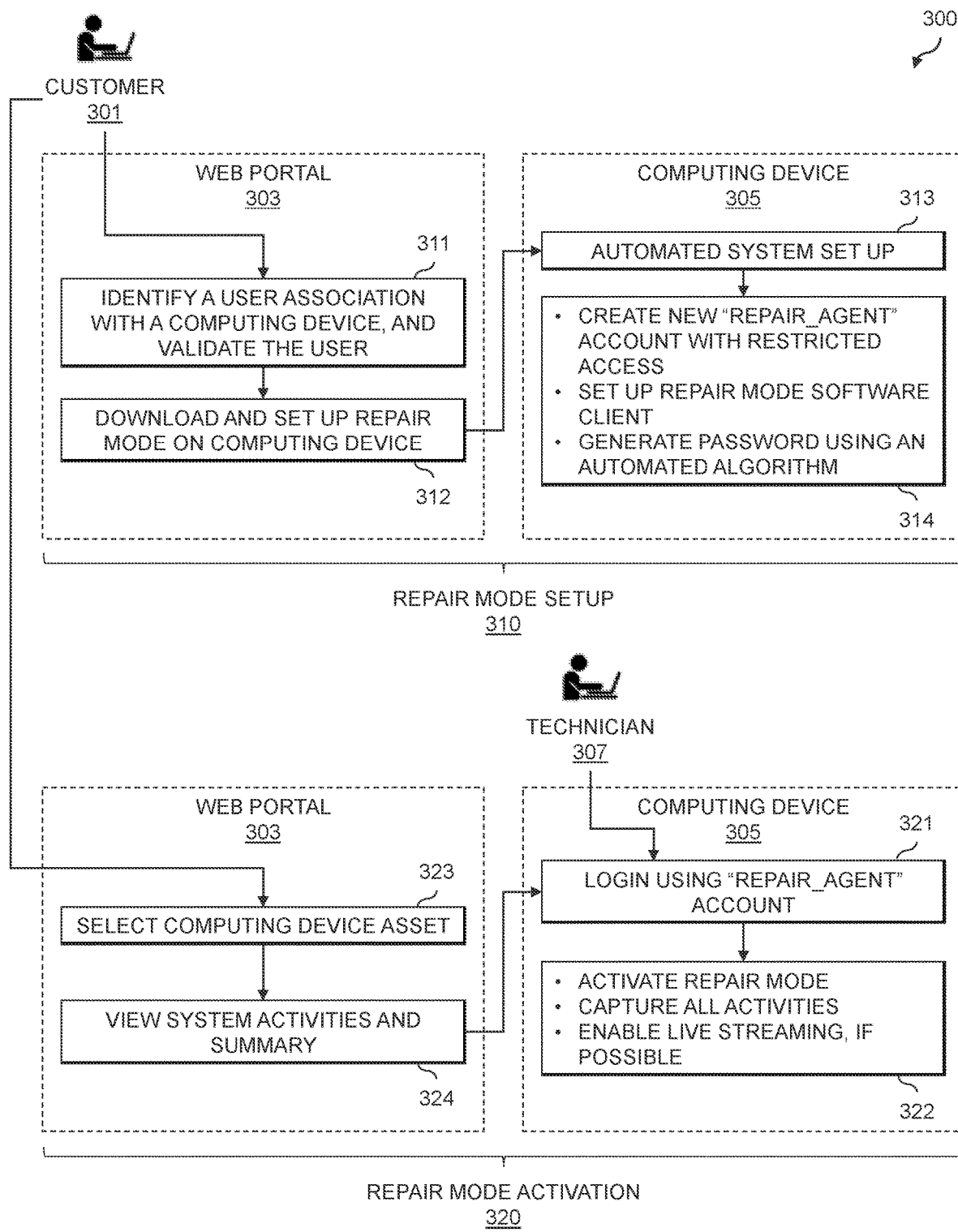
FIG. 3 shows a system flow for customer-initiated set up and activation of repair mode on a computing device in an illustrative embodiment.

FIG. 3 shows a system flow 300 for customer-initiated repair mode setup 310 on a computing device 305, and for repair mode activation 320 on the computing device 305. The repair mode setup 310 begins with a customer 301 logging into a web portal 303 (e.g., which may be operated by a vendor of the computing device 305, an enterprise of which the customer 301 is a part of where the computing device 305 is a device issued by the enterprise to the customer 301, a support or repair center which provides support services for the computing device 305, etc.). In step 311, the web portal 303 identifies a user association between the customer 301 and the computing device 305, and validates whether the customer 301 is an authorized user for the computing device 305. Step 311 may include identifying and mapping the computing device 305 to an authorized customer 301. This can be derived from purchase history and mapped to the customer 301, and made available through web portal 303 or any other customer communication channel. It is assumed that there are different ways to track customer assets (e.g., the computing device 305), and that customers such as customer 301 can manage their assets. When the customer 301 logs into the web portal 303, there should be an option to select the asset (e.g., computing device 305) for which repair mode needs to be set up.

In step 312, the web portal 303 is used to initiate download of repair mode software that is to be set up on the computing device 305. The customer 301, for example, can download an executable file to the computing device 305, which when executed can enable repair mode on the computing device 305. The download option can also be provided by various channels, such as email, on-the-box software set up, etc. This manual step is necessary if the repair mode software is not embedded with the OS of the computing device 305 (e.g., which may be performed by a manufacturer or vendor of the computing device 305, an enterprise which issues the computing device 305 for use by the customer 301, etc.) as described in further detail below with respect to the system flow 400 of FIG. 4.

In step 313, the computing device 305 enters an automated system set up for the repair mode. The automated system set up is performed in step 314, which includes creating a new "Repair_Agent" account with restricted access for the computing device 305. The restricted access may include, for example, access to system files and drivers but no access to user personal data folders. Step 314 also includes setting up a repair mode software client on the computing device 305, and generating a password for the "Repair_Agent" account using an automated algorithm (e.g., which may periodically generate and update the password for the "Repair_Agent" account). The repair mode software client may be implemented as a background service which will monitor for login to the "Repair_Agent" account.

The repair mode activation 320 begins with a technician 307 (e.g., of a support or repair center) logging in to the computing device 305 in step 321 using the "Repair_Agent" account. The computing device 305 then activates repair mode in step 322, and captures all activities performed by the technician 307 on the computing device 305 in the repair mode. Step 322 also includes enabling live streaming (e.g., of the activities performed by the technician 307 on the computing device 305), if possible (e.g., if the computing device 305 has a network connection to a streaming server). The customer 301 in step 323 may use the web portal 303 to select an asset, such as the computing device 305, and in step 324 uses the web portal 303 to view system activities (e.g., the activities performed by the technician 307 on the computing device 305) and/or summary information thereof.

Figure 4:
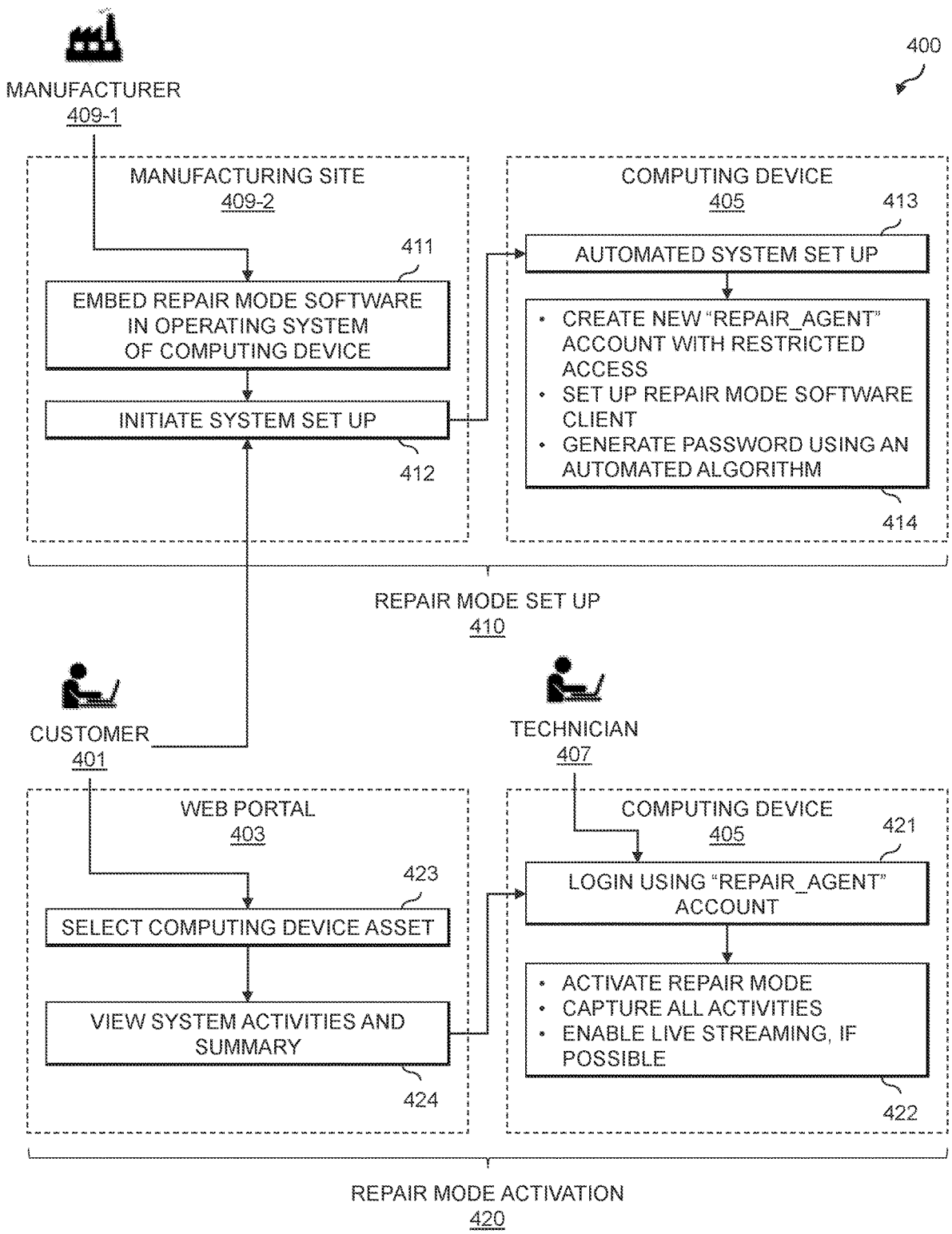
FIG. 4 shows a system flow for manufacturer-initiated set up and activation of repair mode on a computing device in an illustrative embodiment.

FIG. 4 shows a system flow 400 for manufacturer-initiated repair mode setup 410 on a computing device 405, and for repair mode activation 420 on the computing device 405. The repair mode setup 410 begins in step 411 with a manufacturer 409-1 embedding repair mode software in an OS of the computing device 405 (e.g., while the computing device 405 is at a manufacturing site 409-2 operated by the manufacturer 409-1). System setup of the computing device 405 is then performed in step 412. In step 413, the computing device 405 enters an automated system set up for the repair mode. The automated system set up is performed in step 414, which includes creating a new "Repair_Agent" account with restricted access for the computing device 405. Step 414 also includes setting up a repair mode software client on the computing device 405, and generating a password for the "Repair_Agent" account using an automated algorithm (e.g., which may periodically generate and update the password for the "Repair_Agent" account).

The repair mode activation 420 begins with a technician 407 (e.g., of a support or repair center) logging in to the computing device 405 in step 421 using the "Repair_Agent" account. The computing device 405 then activates repair mode in step 422, and captures all activities performed by the technician 407 on the computing device 405 in the repair mode. Step 422 also includes enabling live streaming (e.g., of the activities performed by the technician 407 on the computing device 405), if possible (e.g., if the computing device 405 has a network connection to a streaming server). A customer 401 in step 423 may use a web portal 403 (e.g., operated by a support or repair center that the technician 407 is part of) to select an asset, such as the computing device 405, and in step 424 uses the web portal 403 to view system activities (e.g., the activities performed by the technician 407 on the computing device 405) and/or summary information thereof.

Figure 5:
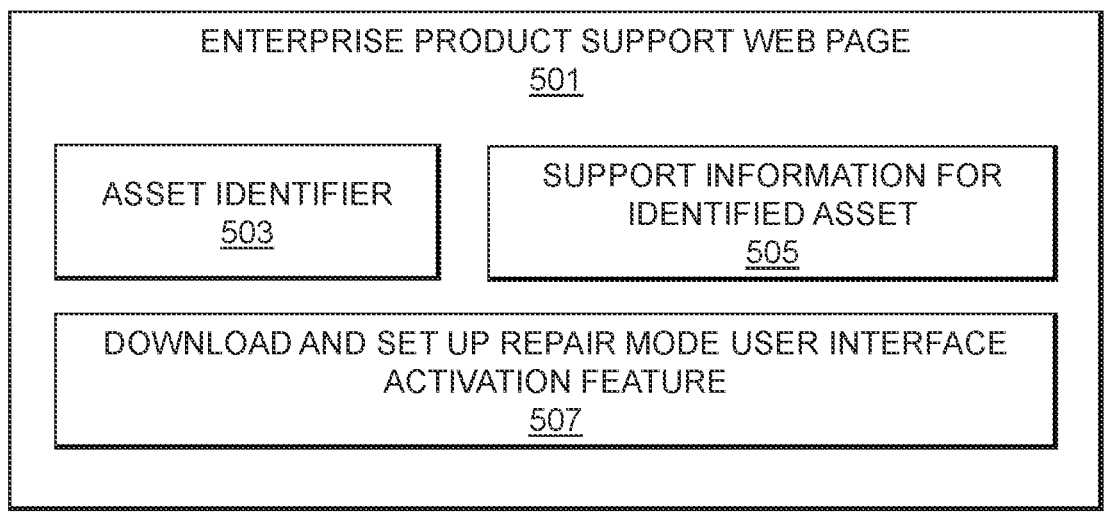
FIG. 5 shows a web portal which may be used to initiate download and set up of repair mode on a computing device in an illustrative embodiment.

It should be noted that there is no specific defined time when the repair mode should be set up. In some embodiments, it is desired to set up the repair mode as soon as a PC or other computing device is received from a manufacturer or vendor (or an enterprise which issues the PC or other computing device for use by a member of that enterprise) and the system is ready to use. This makes sure that if there is any occurrence of hardware failure, repair mode features can be utilized. The repair mode setup can be enabled automatically for new systems where repair mode software is embedded in the OS. This advantageously avoids any manual setup required by customers. FIG. 5 shows an example of an enterprise product support web page 501, which may represent a web portal, which may be used to initiate manual download and set up of repair mode. The web page 501 includes an asset identifier panel 503 (e.g., which would show some identifier of a particular PC or other computing device). The web page 501 also includes a panel 505 with support information for the identified asset, and an activatable user interface feature 507 which when activated initiates download and setup of repair mode for the identified asset.

Password generation and maintenance for a "Repair_Agent" user account will now be described. Having a single password for any user or user account is a security risk. Deriving the password for automated accounts such as the "Repair_Agent" user account poses a different kind of challenge to protect the user account from intruders. The technical solutions described herein utilize an algorithm referred to as Periodical Auto-Generated Passcode (PAGP) for generating a random password, and does not require or recommend saving passwords generated using the PAGP algorithm as-is. Instead, the PAGP algorithm may be used to generate the password for the "Repair_Agent" user account on-demand or as needed by a service technician seeking to perform servicing of a PC or other computing device. PAGP may utilize Time-Based One-Time Password (TOTP) concepts. Advantageously, the password for the "Repair_Agent" user account is not saved in any database, and is instead derived based on a secret key and a counter that is used to generate the password. Service or repair center technicians will have access to a tool that may be used to derive the PAGP-generated password for a system. Using the PAGP-generated password, the technician can login to the system using the "Repair_Agent" user account.

Figure 6:
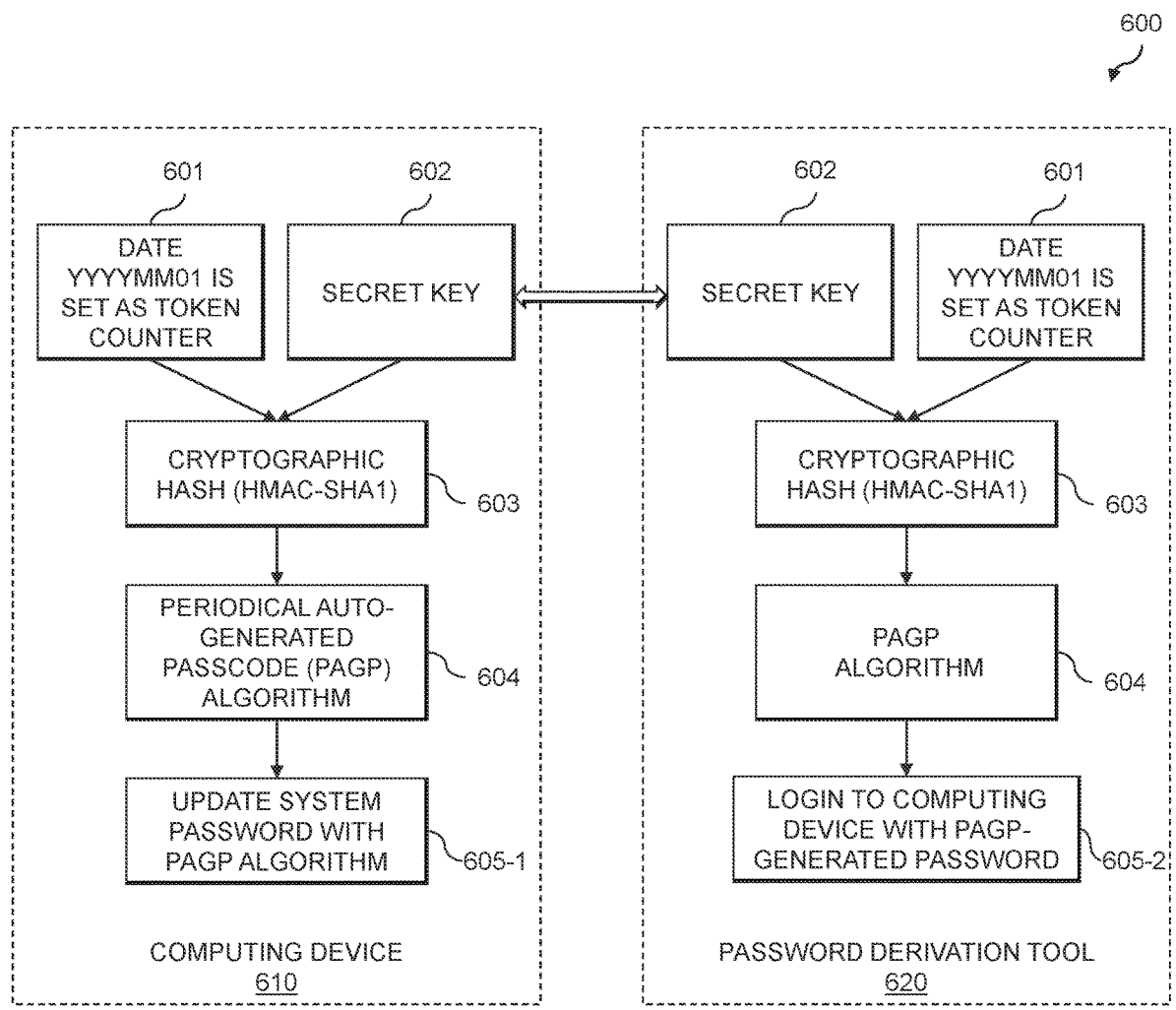
FIG. 6 shows a system flow for application of an algorithm for periodic auto-generation of passwords for a repair mode user account in an illustrative embodiment.

FIG. 6 shows a system flow 600 for generating passwords using the PAGP algorithm. The system flow 600 includes actions that are performed "on-the-box" on a computing device 610 that has a "Repair_Agent" user account set up, as well as actions that are performed by a service technician using a password derivation tool 620 (e.g., where the service technician is seeking to log in to the "Repair_Agent" user account on the computing device 610). The password on the computing device 610 should be updated regularly. In some embodiments, a counter is defined based on the date of the system in step 601. The date may be, for example, the first of the month (e.g., or any other suitable day of the month, day of the week, hour of the day, or other regular interval). In the example of FIG. 6, the token counter uses a "YYYYMM01" format in step 601, where the "01" is constant to make sure that the date considered or used is always the first of the month.

A secret key 602 is also used, where the secret key 602 may be generated based on various asset parameters. Such parameters may include, but are not limited to, a system unique identifier (e.g., a service tag, a serial number, etc.), a customer number, a product model, an invoice number, etc. Each of these parameters may be encrypted and cached in the system while setting up repair mode on the computing device 610. The secret key 602 may be derived with any desired combination of these and other attributes. The token counter in step 601 and secret key 602 are input to a cryptographic hash function in step 603. The cryptographic hash function may comprise, for example, a keyed hash algorithm such as HMAC-SHA1. The PAGP algorithm is then applied in step 604 on the output of the cryptographic hash function in step 603 to generate a system password for the "Repair_Agent" user account.

In step 605-1 on the computing device 610, the system password for the "Repair_Agent" user account is updated based on the output of the PAGP algorithm in step 604. A repair center technician can use the password derivation tool 620, where the technician can provide the necessary attributes to generate the secret key 602, and can use steps 601 through 604 to derive the current PAGP-generated password for the "Repair_Agent" user account on the computing device 610, as well as some number (e.g., three) of previous PAGP-generated passwords for the "Repair_Agent" user account on the computing device 610 (e.g., such that if the computing device 610 had problems updating the password for the "Repair_Agent" user account recently, the technician can use one of the previously-generated passwords to log in to the "Repair_Agent" user account on the computing device 610). The repair center technician in step 605-2 can use one of the PAGP-generated passwords for logging in to the "Repair_Agent" user account on the computing device 610. FIGS. 7A and 7B show pseudocode 700-1 and 700-2 (collectively, pseudocode 700) for the PAGP algorithm.

It should be noted that the PAGP-generated passwords do not need to be (and, in some cases, are preferably) not saved in any data store. Instead, the PAGP algorithm can rely on the token counter in step 601 and the secret key 602 (e.g., which is derived based on product attributes of the computing device 610) for unique password generation on-demand. Thus, the password for the "Repair_Agent" user account can be derived at both the computing device 610 and the password derivation tool 620 using a current value of the token counter in step 601 and the secret key 602.

Figure 8:
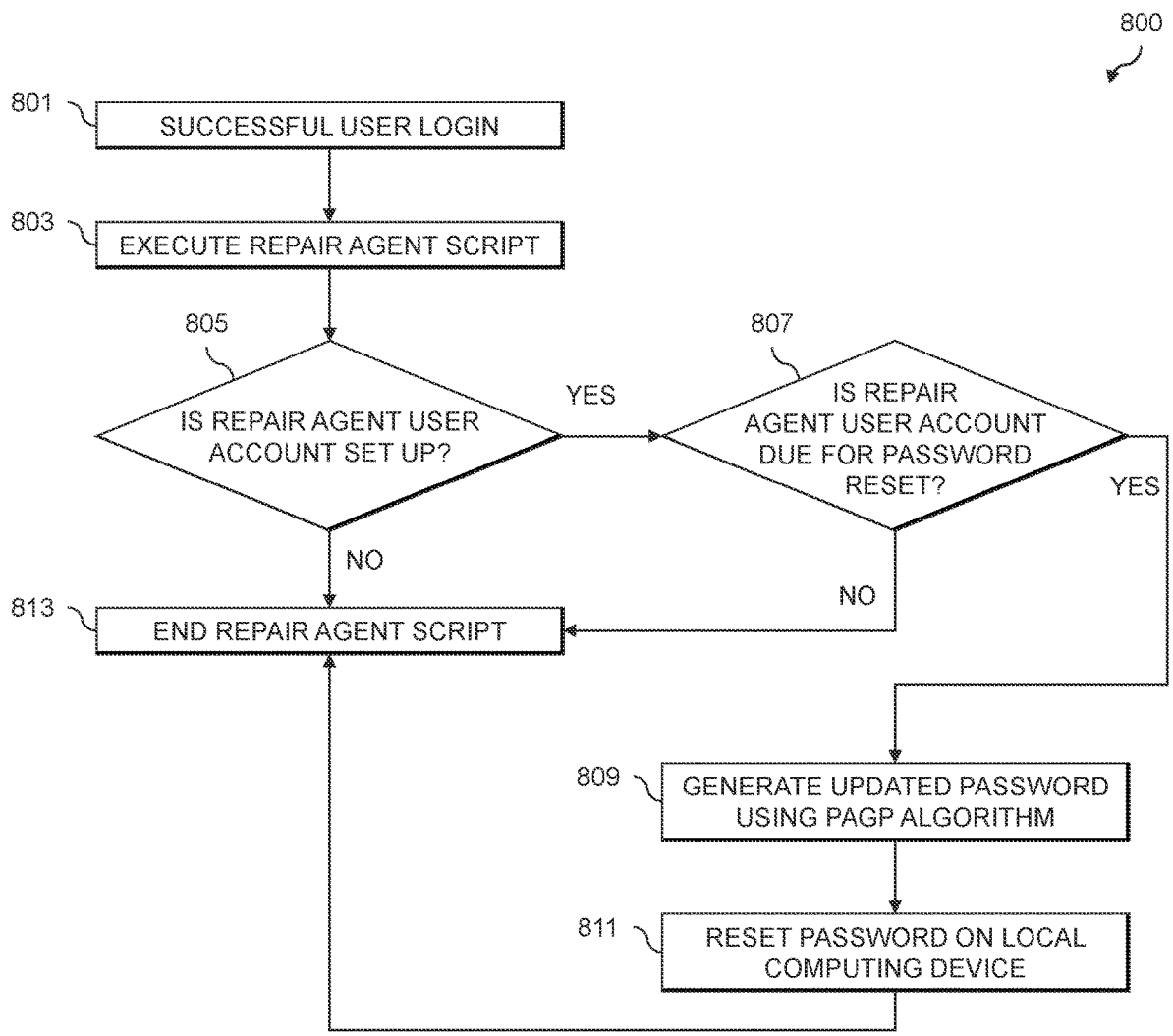
FIG. 8 shows a process flow for updating passwords of a repair mode user account in an illustrative embodiment.

Keeping the password for the "Repair_Agent" user account updated at frequent intervals advantageously addresses security concerns for systems which are submitted to a service or repair center. FIG. 8 shows a process flow 800 which may be used for resetting or updating the password for the "Repair_Agent" user account, where the updated password may be generated using the PAGP algorithm as described above. The process flow 800 begins in step 801 with a successful user login to a computing device. It should be noted that the user login in step 801 may be to any user account of the computing device, and is not limited to user login to the "Repair_Agent" user account. In step 803, a repair agent script is executed. In step 805, a determination is made as to whether a "Repair_Agent" user account has been set up on the computing device. If the result of the step 805 determination is yes, the process flow 800 proceeds to step 807. In step 807, a determination is made as to whether the "Repair_Agent" use account is due for password reset. If the result of the step 807 determination is yes, the process flow proceeds to step 809 where an updated password is generated using the PAGP algorithm. In step 811, the password is reset on the local computing device. The repair agent script ends in step 813 following step 811, or if the step 805 or step 807 determination is no.

Restricting access on a computing device by users logged in via the "Repair_Agent" user account will now be described. Since in some embodiments the "Repair_Agent" user account is intended for use only for troubleshooting purposes, the "Repair_Agent" user account should not have access to any user personal data on the computing device. This can ensure that the "Repair_Agent" user account is used exclusively for troubleshooting, repair, maintenance or other servicing. Activity that takes place while a user is logged in to the "Repair_Agent" user account may also be recorded and potentially live streamed if possible. FIG. 9 shows pseudocode 900 for a script to apply folder restrictions on the "Repair_Agent" user account. Folder restrictions may be applied such that when logged in to the "Repair_Agent" user account, the user will not be able to delete any files related to other users, and cannot view any restricted folders from other users. Further, when logged in to the "Repair_Agent" user account, live streaming and recording of user activity cannot be stopped.

Figure 10:
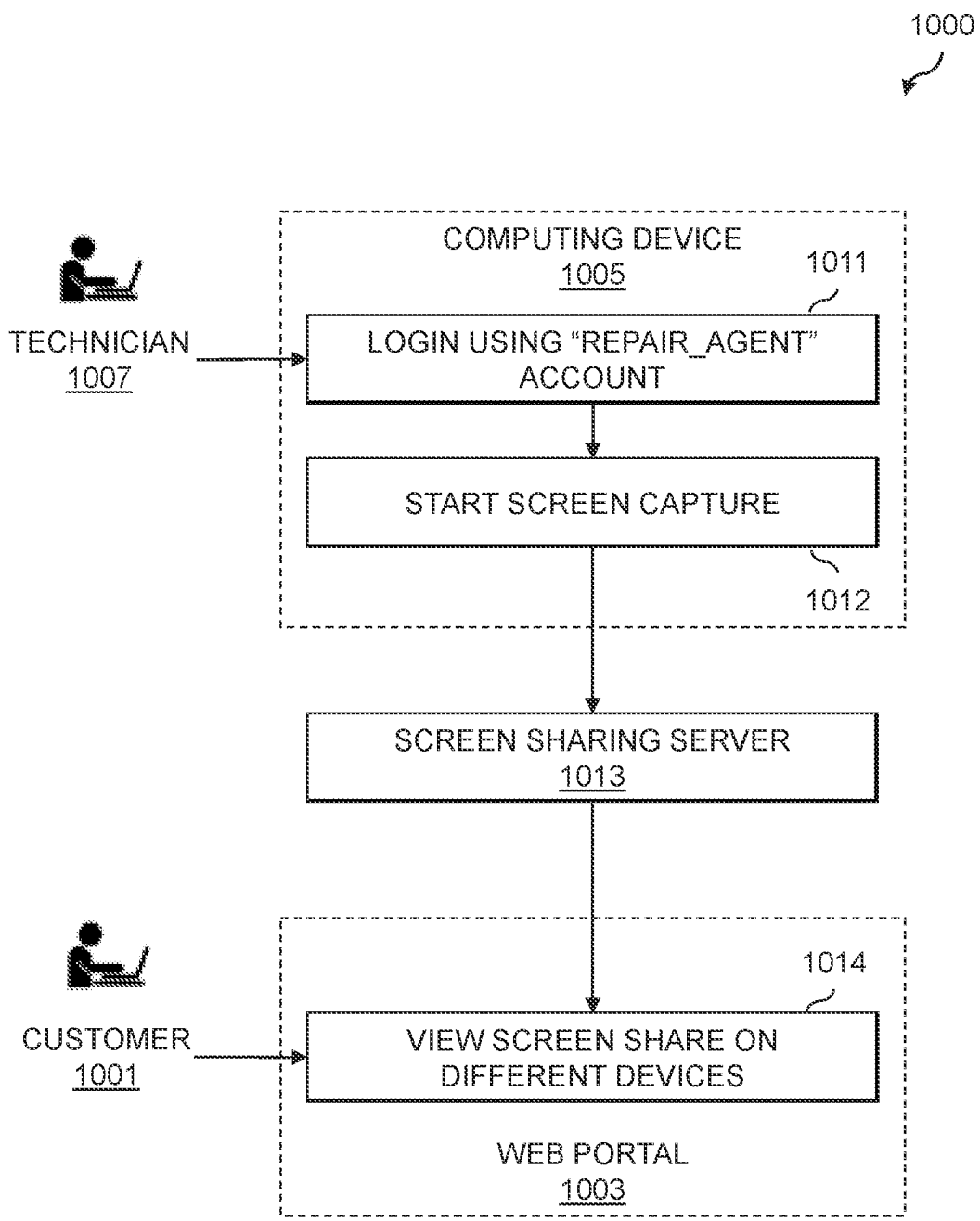
FIG. 10 shows a system flow for sharing screen capture of a computing device being accessed using a repair mode user account in an illustrative embodiment.

FIG. 10 shows a system flow 1000 for repair mode activation. The system flow 1000 beings with a technician 1007 logging in to a computing device 1005 using a "Repair_Agent" account in step 1011. On the computing device 1005, when a user logs in via the "Repair_Agent" account, a remote sharing feature is established that enables a customer 1001 to view the activities performed by the technician 1007. This includes, for example, starting screen capture in step 1012. If network connectivity is available, the screen capture, recordings or remote sharing features stream data to a screen sharing server 1013 if network connectivity to the screen sharing server 1013 is available. If network connectivity is not available, the screen capture, recordings or remote sharing features may be maintained in a secure folder on the computing device 1005 and later provided to the screen sharing server 1013 when network connectivity is established (e.g., once repair mode software is able to establish a connection to the screen sharing server 1013, the screen capture, recordings or remote sharing features are synced with the screen sharing server 1013 and made available to the customer 1001 via a web portal 1003). The customer 1001 can log in to the web portal 1003, and in step 1014 can view the screen captures, recordings or remote sharing features on various different devices (e.g., devices other than the computing device 1005).

Figure 11:
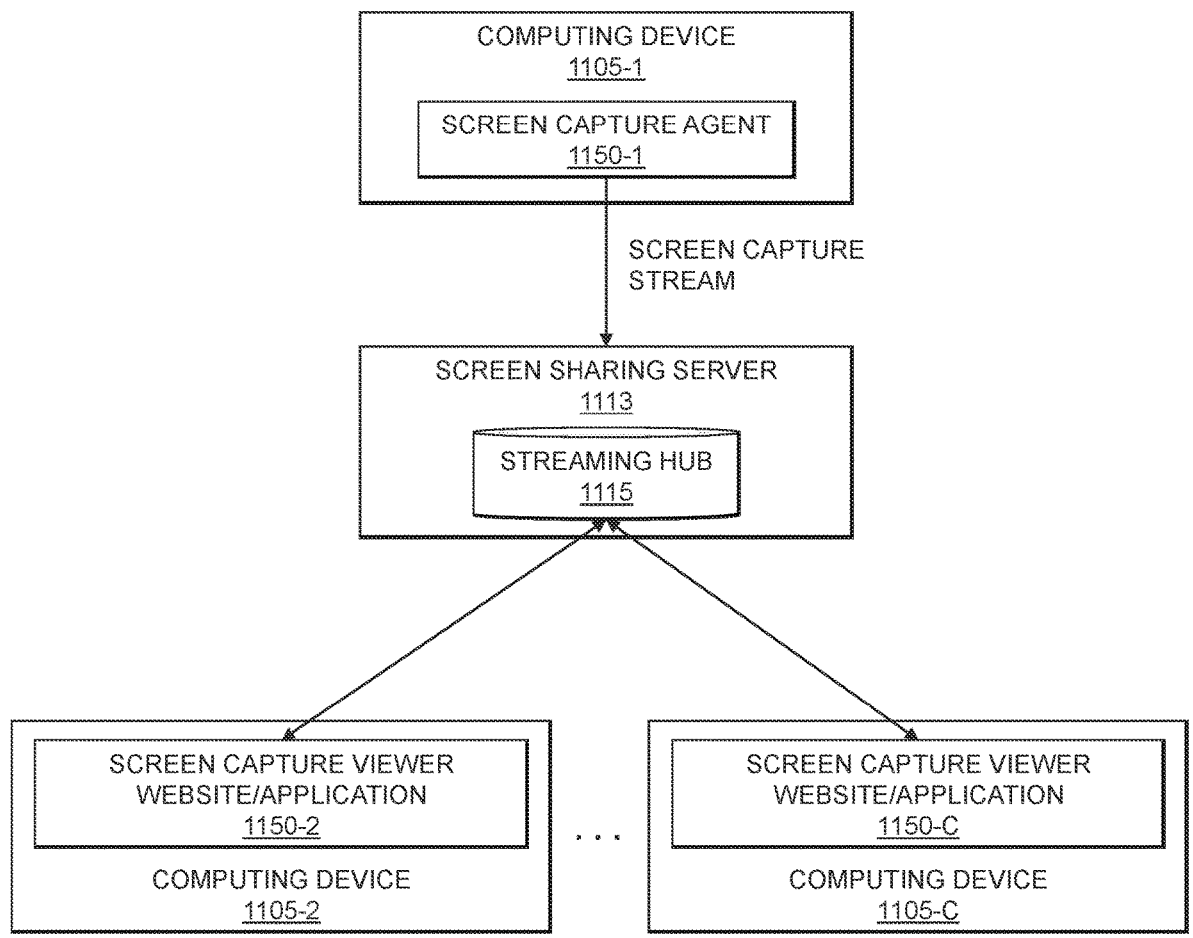
FIG. 11 shows a system for accessing screen capture streams of a computing device being accessed using a repair mode user account in an illustrative embodiment.

There are various technologies which may be used to enable streaming from a computing device to a screen sharing server, and for enabling streaming from the screen sharing server to a web portal/additional computing devices. Such technologies include, but are not limited to, Web Socket, signalR, etc. In some embodiments, live streaming is enabled through a web site (e.g., a web portal) when any user logs into a computing device using a "Repair_Agent" account. FIG. 11 shows an example system 1100, where a computing device 1105-1 runs a screen capture agent 1150-1 which provides a screen capture stream to a screen sharing server 1113 implementing a streaming hub 1115 (e.g., a signalR hub). Additional computing devices 1105-2 through 1105-C can use respective instances of a screen capture viewer website or application 1150-2 through 1150-C to view the screen capture stream from the computing device 1105-1. As noted above, an offline mode may be used in cases where the computing device 1105-1 cannot establish a network connection with the screen sharing server 1113 (e.g., if the computing device 1105-1 has no Internet connectivity while in a service or repair center). In such cases, the screen capture agent 1150-1 running on the computing device 1105-1 will record and store the screen capture stream locally on the computing device 1105-1 and, once a network connection is established with the screen sharing server 1113, the recordings will be synced with the screen sharing server 1113 and made available for viewing by the computing devices 1105-2 through 1105-C.

Repair mode visibility in some embodiments can bring transparency for activities performed on a system while a user is logged in via a "Repair_Agent" account. When a technician in a service or repair center, for example, logs in with the "Repair_Agent" account on a system, authorized customers will be able to view activities performed by the technician on the system via live streaming and/or recordings of screen capture streams on a web site, application or web portal. Customer authorization can be implemented in different ways, such as by identifying user sessions, asset mappings, etc. Once repair or service work is completed and a system is handed over to the customer, a summary of the activities performed by the technician will be generated. This summary may include, for example, logins and logouts, any new installation of drivers or software, any modification of folders, any files that are copied, deleted, accessed or modified, etc.

Illustrative embodiments provide technical solutions for enabling a repair mode on computing devices, which provides an easy-to-use and trustable method for enabling seamless repair or other servicing of computing devices (e.g., including repair of hardware-related issues). The repair mode brings greater transparency and security for computing devices that are submitted to a service or repair center. Further, the technical solutions described herein provide approaches for maintaining a repair user account (e.g., a "Repair_Agent" account) that does not require sharing any password. Instead, the technical solutions provide approaches for using a secret key derived based on asset attributes of a computing device, and for periodically generating and updating passwords for the repair user account (e.g., using a PAGP algorithm) thus bringing higher security to the computing device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for enabling a smart, secure and intuitive repair mode for computing devices will now be described in greater detail with reference to FIGS. 12 and 13. Although described in the context of system 100, these platforms may also be used to implement at least portions of other information processing systems in other embodiments.

Figure 12:
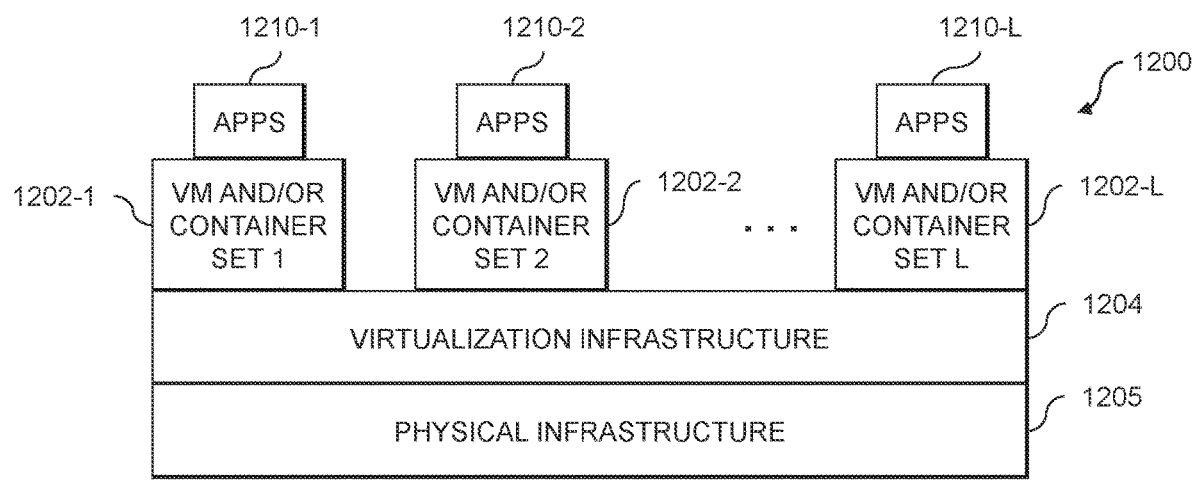
FIGS. 12 and 13 show examples of processing platforms that may be utilized to implement at least a portion of an information processing system in illustrative embodiments.
Figure 13:
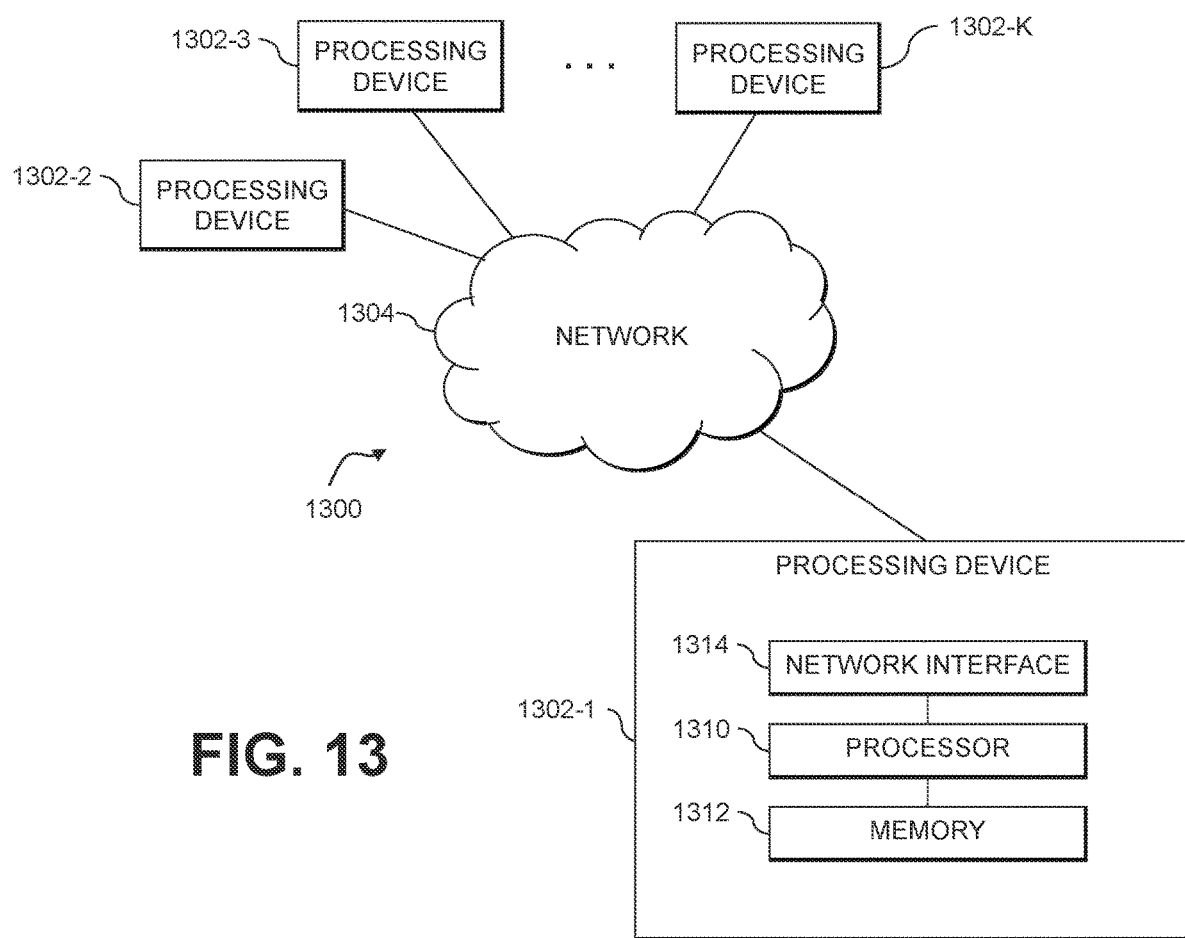

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for enabling a smart, secure and intuitive repair mode for computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, support platforms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
  at least one processing device comprising a processor coupled to a memory;
  the at least one processing device being configured to perform steps of:
    receiving a request for access to a first computing device;
    determining, utilizing a password generation algorithm, a password for a repair mode user account on the first computing device, the repair mode user account having restricted access to user data stored on the first computing device;
    accessing, utilizing the determined password, the repair mode user account on the first computing device;
    recording one or more actions performed on the first computing device while the first computing device is being accessed using the repair mode user account; and
    providing the recorded one or more actions for viewing on a second computing device different than the first computing device;
  wherein the request for access to the first computing device is received while the first computing device is at a repair facility, and wherein the second computing device is (i) outside the repair facility and (ii) associated with an owner of the first computing device.

2. The apparatus of claim 1 wherein the repair facility is part of a support platform providing support services for computing devices of multiple hardware vendors.

3. The apparatus of claim 1 wherein the repair facility is operated by a hardware vendor of the first computing device.

4. The apparatus of claim 1 wherein the repair mode user account restricts access to the user data stored on the first computing device by enforcing folder restrictions using a repair mode software agent running as a background service on the first computing device.

5. The apparatus of claim 1 wherein determining the password for the repair mode user account is based at least in part on a time-varying token counter value and a secret key.

6. The apparatus of claim 5 wherein the time-varying token counter value specifies a designated interval, the designated interval comprising at least one of a given date of each month, a given day of each week, and a given hour of each day.

7. The apparatus of claim 5 wherein the secret key is derived from one or more attributes of the first computing device, the one or more attributes comprising at least one of a system unique identifier of the first computing device, a customer number for a customer that purchased the first computing device, a product model of the first computing device, and an invoice number for the customer purchase of the first computing device.

8. The apparatus of claim 1 wherein determining the password for the repair mode user account is based at least in part on application of a keyed hash function to a time-varying token counter value and a secret key.

9. The apparatus of claim 1 wherein recording the one or more actions performed on the first computing device while being accessed using the repair mode user account comprises generating a screen capture of the first computing device.

10. The apparatus of claim 9 wherein providing the recorded one or more actions for viewing on the second computing device comprises providing live streaming of the generated screen capture of the first computing device to the second computing device.

11. The apparatus of claim 9 wherein providing the recorded one or more actions for viewing on the second computing device comprises providing a recorded stream of the generated screen capture of the first computing device to the second computing device.

12. The apparatus of claim 1 wherein recording the one or more actions performed on the first computing device while being accessed using the repair mode user account comprises generating a summary of the one or more actions.

13. The apparatus of claim 12 wherein the generated summary comprises at least one of:
  login and logout times for the repair mode user account; and
  indications of at least one of drivers and software installed on the first computing device.

14. The apparatus of claim 12 wherein the generated summary comprises at least one of:

modifications to one or more folders of the first computing device; and copying, deletion, access and modification of one or more files of the first computing device.

15. A computer program product comprising a non-transitory processor-readable storage medium having stored therein program code of one or more software programs, wherein the program code when executed by at least one processing device causes the at least one processing device to perform steps of:

receiving a request for access to a first computing device;

determining, utilizing a password generation algorithm, a password for a repair mode user account on the first computing device, the repair mode user account having restricted access to user data stored on the first computing device;

accessing, utilizing the determined password, the repair mode user account on the first computing device;

recording one or more actions performed on the first computing device while the first computing device is being accessed using the repair mode user account; and providing the recorded one or more actions for viewing on a second computing device different than the first computing device;

wherein the request for access to the first computing device is received while the first computing device is at a repair facility, and wherein the second computing device is (i) outside the repair facility and (ii) associated with an owner of the first computing device.

16. The computer program product of claim 15 wherein:

determining the password for the repair mode user account is based at least in part on a time-varying token counter value and a secret key;

the time-varying token counter value specifies a designated interval, the designated interval comprising at least one of a given date of each month, a given day of each week, and a given hour of each day; and the secret key is derived from one or more attributes of the first computing device, the one or more attributes comprising at least one of a system unique identifier of the first computing device, a customer number for a customer that purchased the first computing device, a product model of the first computing device, and an invoice number for the customer purchase of the first computing device.

17. The computer program product of claim 15 wherein determining the password for the repair mode user account is based at least in part on application of a keyed hash function to a time-varying token counter value and a secret key.

18. A method comprising steps of:

receiving a request for access to a first computing device;

determining, utilizing a password generation algorithm, a password for a repair mode user account on the first computing device, the repair mode user account having restricted access to user data stored on the first computing device;

accessing, utilizing the determined password, the repair mode user account on the first computing device;

recording one or more actions performed on the first computing device while the first computing device is being accessed using the repair mode user account; and providing the recorded one or more actions for viewing on a second computing device different than the first computing device;

wherein the request for access to the first computing device is received while the first computing device is at a repair facility, and wherein the second computing device is (i) outside the repair facility and (ii) associated with an owner of the first computing device; and wherein the method is performed by at least one processing device comprising a processor coupled to a memory.

19. The method of claim 18 wherein:

determining the password for the repair mode user account is based at least in part on a time-varying token counter value and a secret key;

the time-varying token counter value specifies a designated interval, the designated interval comprising at least one of a given date of each month, a given day of each week, and a given hour of each day; and the secret key is derived from one or more attributes of the first computing device, the one or more attributes comprising at least one of a system unique identifier of the first computing device, a customer number for a customer that purchased the first computing device, a product model of the first computing device, and an invoice number for the customer purchase of the first computing device.

20. The method of claim 18 wherein determining the password for the repair mode user account is based at least in part on application of a keyed hash function to a time-varying token counter value and a secret key.

* * * * *